US010663982B2

(12) United States Patent
Liu et al.

(10) Patent No.: US 10,663,982 B2
(45) Date of Patent: May 26, 2020

(54) DOUBLE-SPRING AND HIGH-PRECISION HYSTERETIC PRESSURE CONTROL VALVE

(71) Applicant: CHINA UNIVERSITY OF MINING AND TECHNOLOGY, Jiangsu (CN)

(72) Inventors: Xiumei Liu, Jiangsu (CN); Ruirui Li, Jiangsu (CN); Beibei Li, Jiangsu (CN); Jie He, Jiangsu (CN)

(73) Assignee: CHINA UNIVERSITY OF MINING AND TECHNOLOGY, Jiangsu (CN)

( * ) Notice: Subject to any disclaimer, the term of this patent is extended or adjusted under 35 U.S.C. 154(b) by 61 days.

(21) Appl. No.: 16/302,677

(22) PCT Filed: Jan. 16, 2018

(86) PCT No.: PCT/CN2018/072846
§ 371 (c)(1),
(2) Date: Nov. 19, 2018

(87) PCT Pub. No.: WO2019/071871
PCT Pub. Date: Apr. 18, 2019

(65) Prior Publication Data
US 2020/0133311 A1    Apr. 30, 2020

(30) Foreign Application Priority Data
Oct. 9, 2017   (CN) .......................... 2017 1 0928386

(51) Int. Cl.
*G05D 7/01*      (2006.01)
*F16K 31/56*     (2006.01)
(Continued)

(52) U.S. Cl.
CPC ............. *G05D 7/0173* (2013.01); *F16K 1/54* (2013.01); *F16K 31/12* (2013.01); *F16K 31/56* (2013.01)

(58) Field of Classification Search
CPC ................. G05D 7/014; G05D 7/0173; Y10T 137/7788; F16K 17/30
See application file for complete search history.

(56) References Cited

U.S. PATENT DOCUMENTS

| | | | |
|---|---|---|---|
| 4,197,874 A | 4/1980 | Neff | |
| 4,275,758 A | 6/1981 | Masuda | |
| 2009/0101218 A1 | 4/2009 | Ilmberger et al. | |

FOREIGN PATENT DOCUMENTS

| | | |
|---|---|---|
| CN | 202001688 | 10/2011 |
| CN | 103375626 | 10/2013 |

(Continued)

OTHER PUBLICATIONS

"International Search Report (Form PCT/ISA/210)", dated Apr. 20, 2018, pp. 1-5.

*Primary Examiner* — Reinaldo Sanchez-Medina
*Assistant Examiner* — Nicole Gardner
(74) *Attorney, Agent, or Firm* — JCIPRNET

(57) ABSTRACT

Disclosed in the present invention is a double-spring and high-precision hysteretic pressure control valve, including an upper valve body, a lower valve body, a double-spring pressure adjustment valve, a spring energy storage linkage mechanism, and a main valve. The double-spring pressure adjustment valve includes a rough adjustment stud, a rough adjustment spring, a fine adjustment stud, a fine adjustment spring, a spring guide sleeve, and a pressure adjustment valve spool. The spring energy storage linkage mechanism includes a guide block, a valve spool control linkage, a tension spring, and a tension spring shift lever and a tension spring sliding hook. The valve spool control linkage is connected to the guide block at one end, and connected to a main valve spool drive rod via a pin at the other end. The tension spring sliding hook is mounted on the guide block, and one end of the shift lever is placed below the tension (Continued)

spring sliding hook so as to drive the tension spring sliding hook to move upwards, thereby controlling the state of the tension spring and enabling energy storage of the spring. The spring energy storage linkage mechanism make the valve spool to open and close momentarily at the right portion. The double-spring and high-precision hysteretic pressure control valve according to the present invention has a low cost, and can provide precise control of opening and closing pressures for the pressure control valve and control of both states of opening and closing for the main valve.

4 Claims, 8 Drawing Sheets

(51) Int. Cl.
     *F16K 31/12*      (2006.01)
     *F16K 1/54*      (2006.01)

(56) References Cited

FOREIGN PATENT DOCUMENTS

| | | |
|---|---|---|
| CN | 103671324 | 3/2014 |
| CN | 204267413 | 4/2015 |
| CN | 107504201 | 12/2017 |

DOUBLE-SPRING AND HIGH-PRECISION HYSTERETIC PRESSURE CONTROL VALVE

CROSS-REFERENCE TO RELATED APPLICATION

This application is a 371 application of the international PCT application serial no. PCT/CN2018/072846, filed on Jan. 16, 2018, which claims the priority benefit of China application no. 201710928386.6, filed on Oct. 9, 2017. The entirety of each of the above-mentioned patent applications is hereby incorporated by reference herein and made a part of this specification.

BACKGROUND OF THE INVENTION

Field of the Invention

The present invention relates to a double-spring and high-precision hysteretic pressure control valve, which is applicable to a low pressure operating environment where relatively high precision is required for a pressure control valve.

Description of Related Art

With the development of global industries as well as the continuous expansion of construction scale and the continuous development of economy in China, the field and scope of application of hydraulic technology is continuously expanding. As a main component of a hydraulic system, a hydraulic valve plays a crucial role in the hydraulic system, and people have an increasingly higher requirement on its precision and operating environment. Accordingly, the improvement of control precision and control speed has always been a focus in various industries, and has a great market prospect in many mechanical industries, especially in an occasion requiring high-precision control.

At present, among a variety of hydraulic valve technologies, ultra-high-speed electro-hydraulic servo proportional technology has a relatively high control precision. However, this technology has a very high cost and is applied only in some famous companies for injection molding machines. In China, control with a low-speed proportional valve is generally used, with low efficiency and poor precision. Thus, research on high-precision hydraulic valves has become the key to whether manufacturers remain in a favorable position in increasingly fierce market competition.

Pressure control valve is a generic term of valves for controlling pressure. Usually, valves for controlling pressure are collectively referred to as pressure control valves, which are mainly used to meet requirements of a force or torque for an actuating mechanism. Pressure control valves include a safety valve, an overflow valve, a reducing valve, and a sequence valve. In the market, a common pressure valve has slow response speed, low control precision, poor stability, high noise, and poor resistance to soiling, and a proportional pressure valve and a servo valve with high control precision and fast response speed have a very high cost and low wear resistance.

It is of great theoretical significance and practical value for advancement in the whole hydraulic field to develop a high-precision hydraulic valve which has good performance, a simple structure, operationally reliable, low cost, and attractive to both manufacturers and customers.

SUMMARY OF THE INVENTION

Objective of invention: in order to overcome the disadvantages existing in the prior art, the present invention provides a double-spring and high-precision hysteretic pressure control valve, which is a pressure control valve that has a simple structure, low cost, high control precision, and a fast response speed, and can make the valve close momentarily under low pressure using its own structure.

Technical Solution: in order to achieve the above objective, the present invention employs the following technical solutions:

A double-spring and high-precision hysteretic pressure control valve, comprising a lower valve body, an upper valve body, a double-spring pressure adjustment valve, a main valve, and a spring energy storage linkage mechanism;

the lower valve body is provided with an oil inlet chamber and an oil inlet, and the oil inlet chamber is communicated with an external oil source via the oil inlet;

a pressure control valve chamber that extends vertically and an oil drain hole are provided on the left side of the upper valve body, and an internal thread is provided at an upper portion of the pressure control valve chamber; a main valve chamber with three step-surfaces that extends vertically and an oil outlet are provided on the right side of the upper valve body, the three step-surfaces gradually decrease in diameter from top to bottom, and an internal thread is provided in an upper step-surface area;

the lower valve body is fixed to the upper valve body, and the oil inlet chamber is communicated with the pressure control valve chamber and the main valve chamber, respectively;

the double-spring pressure adjustment valve includes a rough adjustment stud, a rough adjustment spring, a fine adjustment stud, a fine adjustment spring, a spring guide sleeve, and a pressure adjustment valve spool, wherein the rough adjustment stud is provided with a threaded through-hole that extends vertically, and a rough adjustment spring mounting boss is provided at the bottom of the rough adjustment stud; a fine adjustment spring mounting boss is provided at the bottom of the fine adjustment stud, and a spring guide pillar is provided on an upper surface of the pressure adjustment valve spool; the fine adjustment stud is mounted within the rough adjustment stud via a threaded structure, and the rough adjustment stud is mounted at an upper portion of the pressure control valve chamber via a threaded structure, the pressure adjustment valve spool is provided at a lower portion of the pressure control valve chamber, upper and lower ends of the rough adjustment spring are sleeved on the rough adjustment spring mounting boss and the spring guide pillar, respectively, upper and lower ends of the fine adjustment spring are sleeved on the fine adjustment spring mounting boss and the spring guide pillar, respectively, and lower ends of the fine adjustment spring and the rough adjustment spring are separated by the spring guide sleeve;

the main valve includes a main valve cover, a main valve spool, and a main valve spool drive rod, wherein the main valve cover is provided with a main valve spool guide hole, and the main valve spool is a cylindrical structure with its lower end tapering into a cone, and the diameter of a large end face of the cone (i.e. the diameter of the cylinder) is larger than the inner diameter of a lower step-surface of the main valve chamber; the main valve cover is mounted in the upper step-surface area of the main valve chamber via a threaded structure, an upper portion of the main valve spool is extended into the main valve spool guide hole, a lower portion of the main valve spool is extended into the lower step-surface area of the main valve chamber, and an upper end of the main valve spool drive rod is fixed to the cone at its tip;

the spring energy storage linkage mechanism includes a guide block, a valve spool control linkage, a tension spring, and a tension spring shift lever and a tension spring sliding hook, wherein a left side face of the guide block is an arc guide rail with its middle portion protruding to the left, the tension spring sliding hook is mounted on the arc guide rail, and an upper end of the tension spring shift lever is fixed to a lower surface of the pressure adjustment valve spool; a left end of the valve spool control linkage is connected to the middle portion of the guide block via a clevis pin, an elongated hole is provided on a right end of the valve spool control linkage, a lower end of the main valve spool drive rod is connected to the elongated hole on the right end of the valve spool control linkage via a pin poll, and both ends of the tension spring are engaged with a right portion of the valve spool control linkage and the tension spring sliding hook, respectively; when the pressure adjustment valve spool drives the tension spring shift lever to move up/down, a lower/upper claw of the tension spring shift lever drives the tension spring sliding hook to move up/down along the arc guide rail: when the tension spring sliding hook moves to an upper-most position on the arc guide rail, the right end of the valve spool control linkage moves upwards to its upper-most position; when the tension spring sliding hook moves to a lower-most position on the arc guide rail, the right end of the valve spool control linkage moves downwards to its lower-most position; and when the tension spring sliding hook moves to the upper-most position on the arc guide rail, up and down movement of the right end of the valve spool control linkage drives the main valve spool drive rod and the main valve spool to move vertically.

In particular, the spring guide pillar on the upper surface of the pressure adjustment valve spool has a same diameter as that of the fine adjustment spring mounting boss at the bottom of the fine adjustment stud, and the height of the spring guide sleeve is smaller than or equal to the height of the rough adjustment spring when being completely compressed.

In particular, the height of the guide block is the same as the depth of the oil inlet chamber, and an upper surface and a lower surface of the guide block conform to a lower surface of the upper valve body and a lower bottom surface of the oil inlet chamber, respectively; a mounting boss is provided at an upper portion of the guide block, and a guide block mounting groove is provided on the lower surface of the upper valve body, and the mounting boss is inserted into the guide block mounting groove.

In particular, the lower valve body and the upper valve body are fixedly connected via a bolt.

The operation process of the double-spring and high-precision hysteretic pressure control valve according to the present invention is as follow: a hydraulic oil enters the lower valve body via an oil inlet, and with an increase in pressure of the hydraulic oil, a pressure adjustment valve spool moves upwards and drives a tension spring shift lever to move upwards, such that a lower claw of the tension spring shift lever drives a tension spring sliding hook to move upwards along an arc guide rail, with the tension spring being stretched gradually, and when the tension spring sliding hook moves to a protrusion at a middle portion of the arc guide rail, the tension spring reaches its maximum amount of stretching and has a tendency to restore the original length; the tension spring sliding hook continues to move upwards, and the tension spring contracts back momentarily, which drives the tension spring sliding hook and a valve spool control linkage to move upwards, so as to drive a main valve spool to move upwards, achieving momentary opening of a right loop. When the pressure of the hydraulic oil decreases gradually, the pressure adjustment valve spool would descend gradually, and drives the tension spring shift lever to move downwards, such that an upper claw of the tension spring shift lever drives the tension spring sliding hook to move downwards along the arc guide rail, with the tension spring being stretched gradually, and when the tension spring sliding hook moves to the protrusion at the middle portion of the arc guide rail, the tension spring reaches its maximum amount of stretching and has a tendency to restore the original length; the tension spring sliding hook continues to move downwards, and the tension spring contracts back momentarily, which drives the tension spring sliding hook and the valve spool control linkage to move downwards, so as to drive the main valve spool to move downwards, achieving momentary closing of the right loop.

Advantageous Effect: the double-spring and high-precision hysteretic pressure control valve according to the present invention has a simple structure, low cost, high control precision, a fast response speed, and enables momentary closing under low pressure with its own structure.

Figure 1:
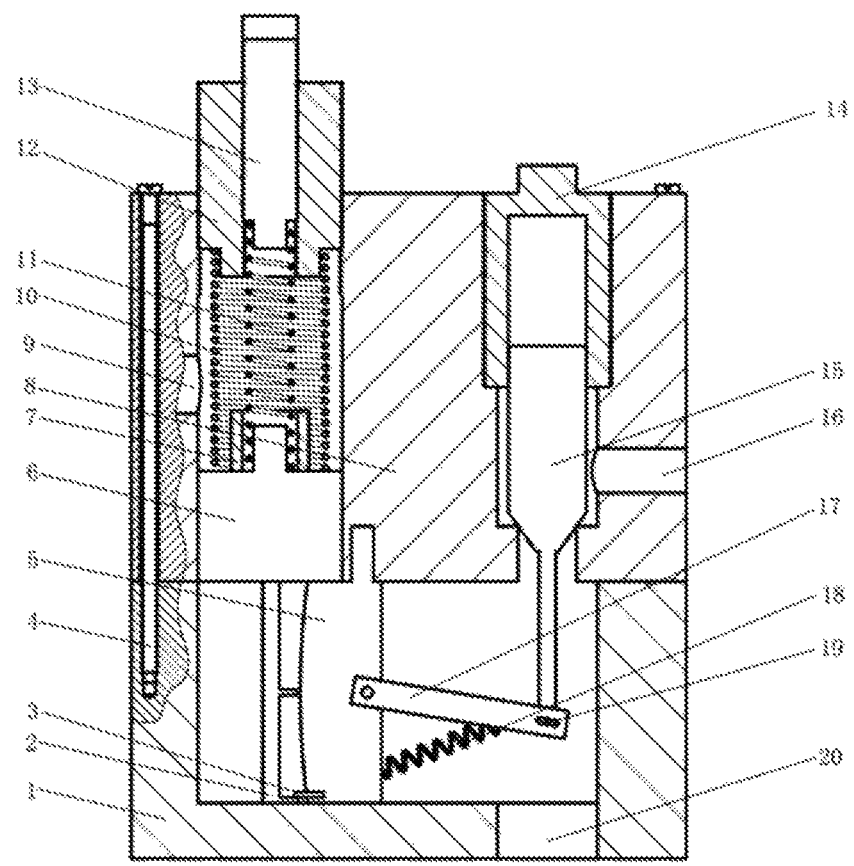
FIG. 1 is a sectional structural schematic view of the present invention where a main valve is in a closed state.
Figure 2:
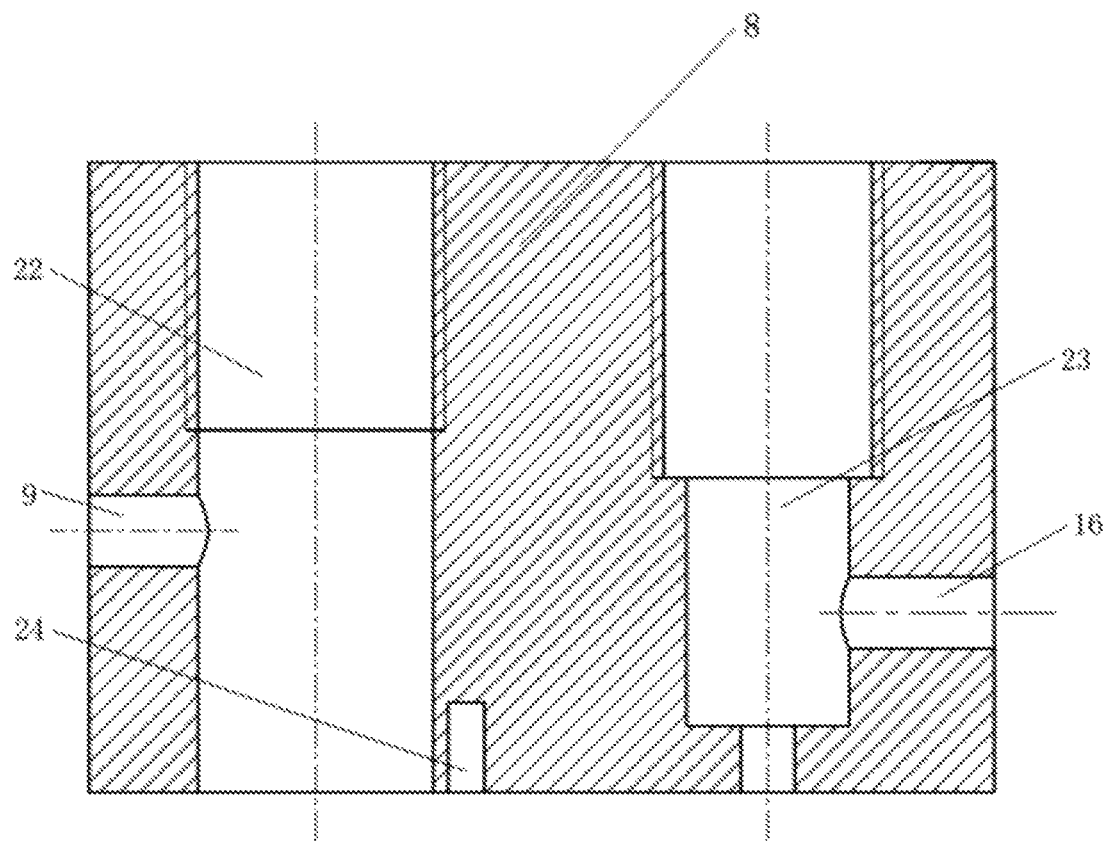
FIG. 2 is a sectional structural schematic view of an upper valve body.
Figure 3:
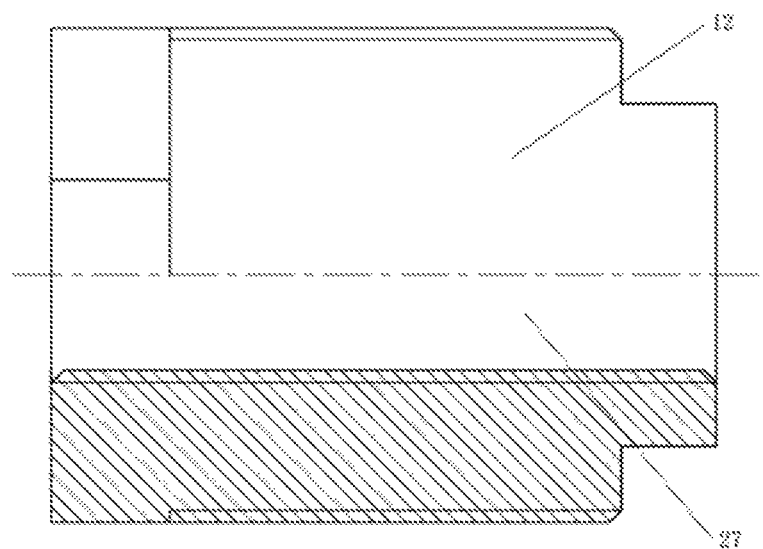
FIG. 3 is a sectional structural schematic view of a rough adjustment stud.
Figure 4:
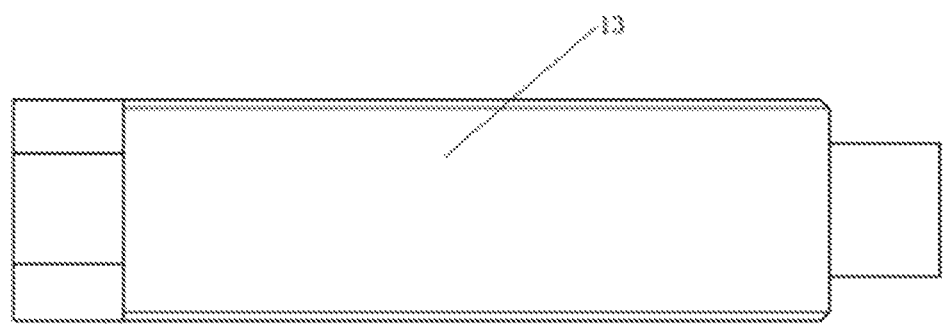
FIG. 4 is a sectional structural schematic view of a fine adjustment stud.
Figure 5:
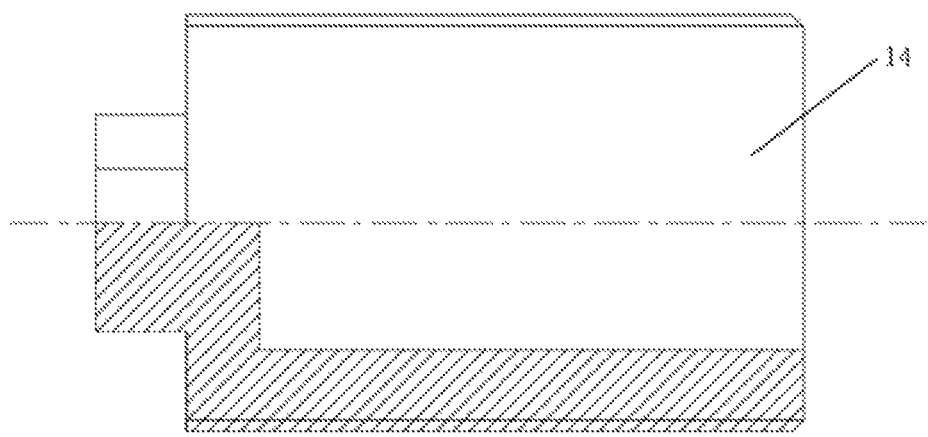
FIG. 5 is a sectional structural schematic view of a main valve cover.
Figure 6:
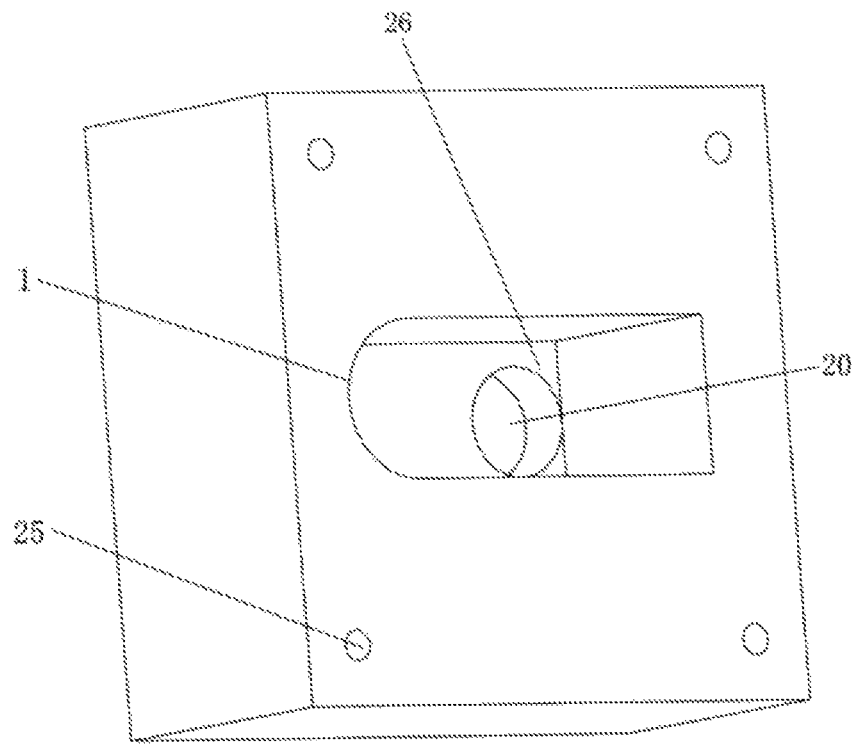
FIG. 6 is a structural schematic view of a lower valve body.
Figure 7:
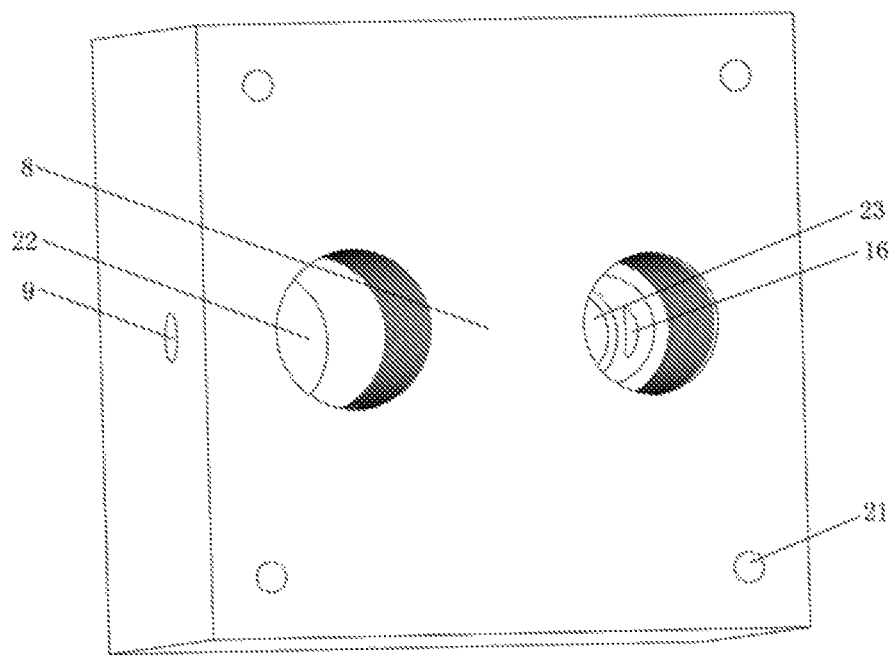
FIG. 7 is a structural schematic view of an upper valve body.
Figure 8:
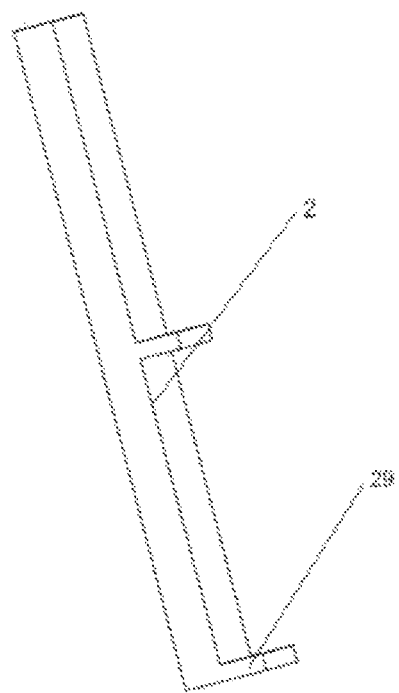
FIG. 8 is a structural schematic view of a tension spring shift lever.
Figure 9:
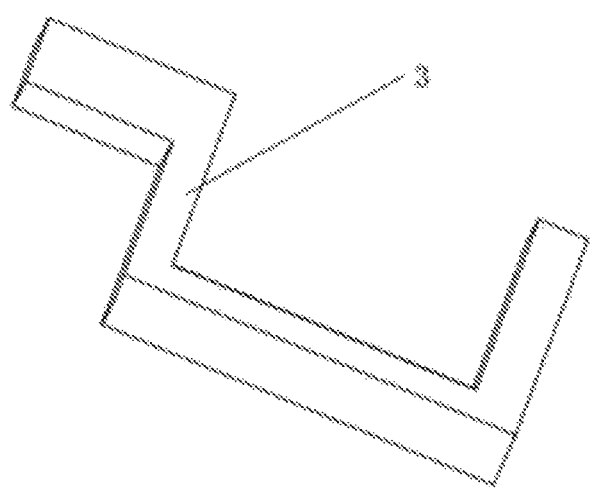
FIG. 9 is a structural schematic view of a tension spring sliding hook.
Figure 10:
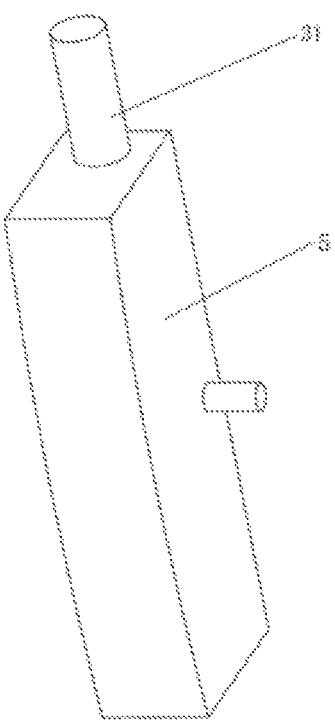
FIG. 10 is a structural schematic view of a guide block.
Figure 11:
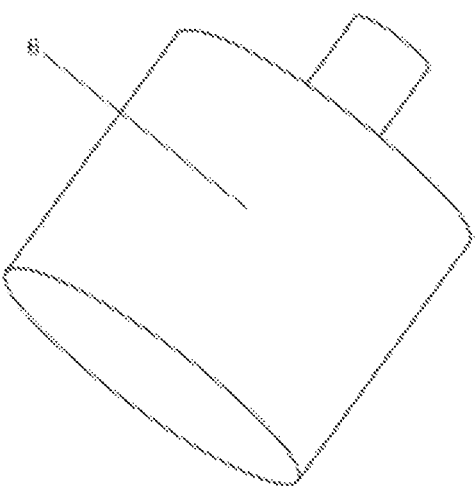
FIG. 11 is a structural schematic view of a pressure adjustment valve spool.
Figure 12:
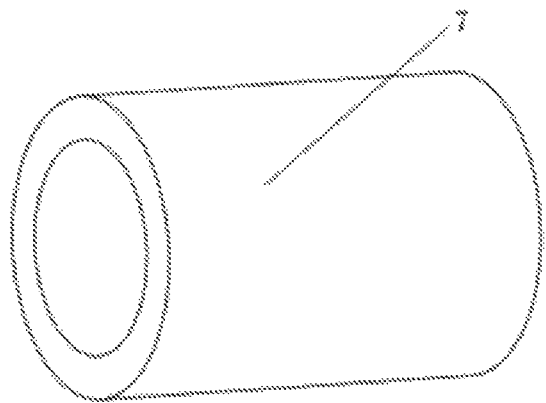
FIG. 12 is a structural schematic view of a spring guide sleeve.
Figure 13:
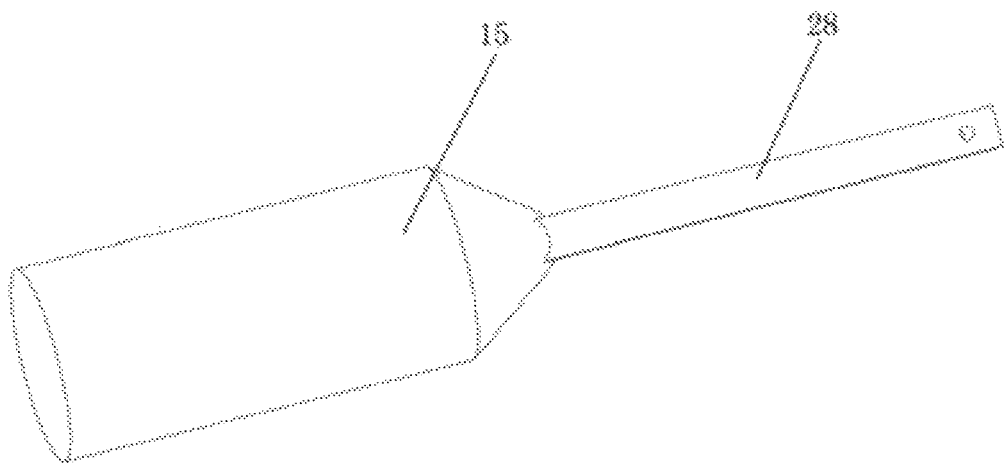
FIG. 13 is a structural schematic view of a main valve spool.
Figure 14:
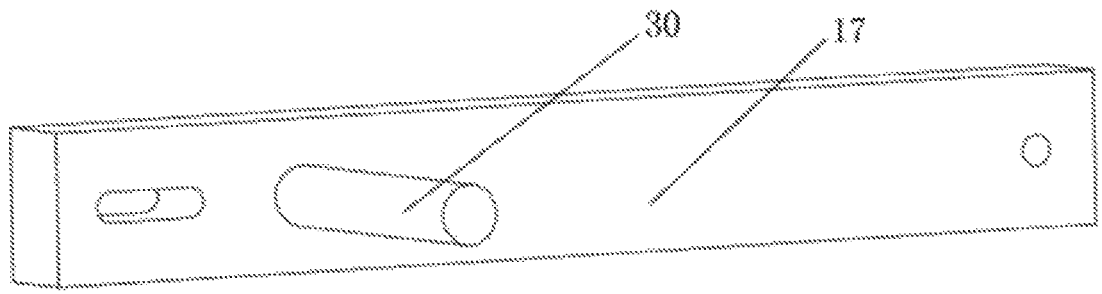
FIG. 14 is a structural schematic view of a valve spool control linkage.
Figure 15:
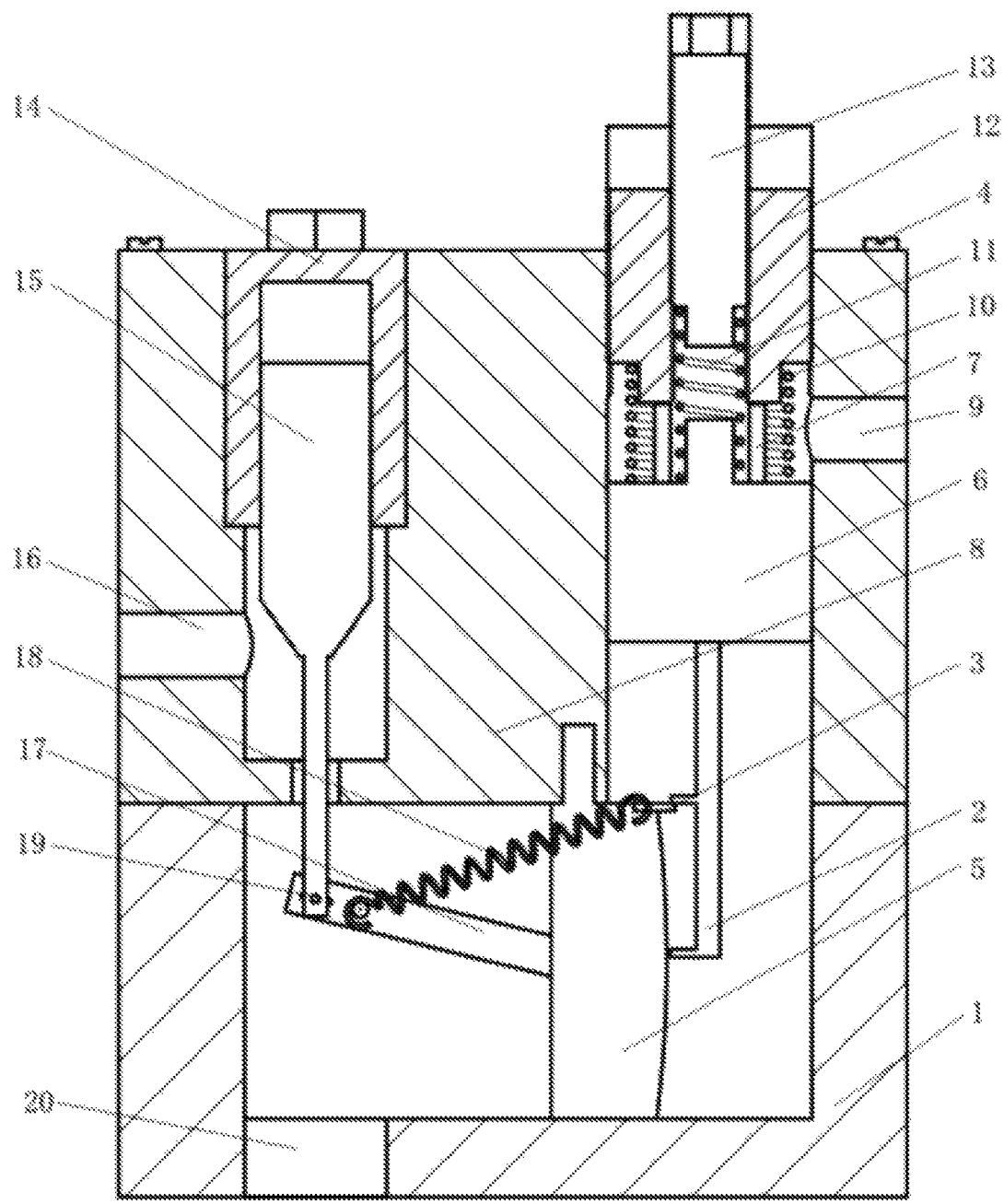
FIG. 15 is a sectional structural schematic view of the present invention where a main valve is in an open state.

In the drawings: 1—lower valve body, 2—tension spring shift lever, 3—tension spring sliding hook, 4—bolt, 5—guide block, 6—pressure adjustment valve spool, 7—spring guide sleeve, 8—upper valve body, 9—oil drain hole, 10—rough adjustment spring, 11—fine adjustment spring, 12—rough adjustment stud, 13—fine adjustment stud, 14—main valve cover, 15—main valve spool, 16—oil outlet, 17—valve spool control linkage, 18—tension spring, 19—pin, 20—oil inlet, 21—connecting through-hole, 22—pressure control valve chamber, 23—main valve chamber, 24—guide block mounting groove, 25—threaded hole, 26—oil inlet chamber, 27—threaded through-hole, 28—main valve spool drive rod, 29—claw, 30—spring hook, and 31—mounting boss.

DETAILED DESCRIPTION OF THE EMBODIMENTS

The present invention will be further described below with reference to the accompanying drawings.

As shown in FIG. 1, a double-spring and high-precision hysteretic pressure control valve includes a lower valve body 1, an upper valve body 8, a double-spring pressure adjustment valve, a main valve, and a spring energy storage linkage mechanism.

A pressure control valve chamber 22 that extends vertically and an oil drain hole 9 are provided on the left side of the upper valve body 8, and an internal thread is provided at an upper portion of the pressure control valve chamber 22, and a middle portion of the pressure control valve chamber 22 is communicated with the oil drain hole 9. A main valve chamber 23 with three step-surfaces that extends vertically and an oil outlet 16 are provided on the right side of the upper valve body 8, the three step-surfaces gradually decrease in diameter from top to bottom, an internal thread is provided in an upper step-surface area, and a middle step-surface is communicated with the oil outlet 16. A guide block mounting groove 24 is provided on a lower surface of the upper valve body 8, and four connecting through-holes 21 are provided at four corners of the upper valve body 8.

An oil inlet chamber 26 and an oil inlet 20 are provided on the lower valve body 1, and the oil inlet chamber 26 is communicated with an external oil source via the oil inlet 20; four threaded holes 25 are also provided on the lower valve body 1, the four threaded holes corresponding to the four connecting through-holes 21, respectively; a bolt 4 passes through the connecting through-hole 21 and is screwed into the threaded hole, so as to fix the lower valve body 1 and the upper valve body 8 together; and the oil inlet chamber 26 is communicated with the pressure control valve chamber 22 and the main valve chamber 23, respectively.

The double-spring pressure adjustment valve is mounted in the pressure control valve chamber 22, and includes a rough adjustment stud 12, a rough adjustment spring 10, a fine adjustment stud 13, a fine adjustment spring 11, a spring guide sleeve 7, and a pressure adjustment valve spool 6, wherein the rough adjustment stud 12 is provided with a threaded through-hole 27 that extends vertically, and a rough adjustment spring mounting boss is provided at the bottom of the rough adjustment stud 12; a fine adjustment spring mounting boss is provided at the bottom of the fine adjustment stud 13, and a spring guide pillar is provided on an upper surface of the pressure adjustment valve spool 6; the fine adjustment stud 13 is mounted within the rough adjustment stud 12 via a threaded structure, the rough adjustment stud 12 is mounted at an upper portion of the pressure control valve chamber 22 via a threaded structure, the pressure adjustment valve spool 6 is provided at a lower portion of the pressure control valve chamber 22, upper and lower ends of the rough adjustment spring 10 are sleeved on the rough adjustment spring mounting boss and the spring guide pillar, respectively, upper and lower ends of the fine adjustment spring 11 are sleeved on the fine adjustment spring mounting boss and the spring guide pillar, respectively, and lower ends of the fine adjustment spring 11 and the rough adjustment spring 10 are separated by the spring guide sleeve 7.

In this example, the outer diameter of the rough adjustment spring 10 is slightly small than the inner diameter of the pressure control valve chamber 22, and the inner diameter of the rough adjustment spring 10 is slightly larger than the diameter of the rough adjustment spring mounting boss; the outer diameter of the fine adjustment spring 11 is slightly small than the inner diameter of the threaded through-hole 27, and the inner diameter of the fine adjustment spring 11 is slightly larger than the diameter of the fine adjustment spring mounting boss; the spring guide pillar on the upper surface of the pressure adjustment valve spool 6 has a same diameter as that of the fine adjustment spring mounting boss at the bottom of the fine adjustment stud 13; the inner diameter of the spring guide sleeve 7 is slightly larger than the outer diameter of the fine adjustment spring 11, the outer diameter of the spring guide sleeve 7 is slightly smaller than the inner diameter of the rough adjustment spring 10, and the height of the spring guide sleeve 7 is smaller than or equal to the height of the rough adjustment spring 10 when being completely compressed. In use, an amount of compression of the rough adjustment spring 10 is controlled by rotating the rough adjustment stud 12, so as to change pressure on the pressure adjustment valve spool 6; and if a small amount of change is desired, an amount of compression of the fine adjustment spring 11 is controlled by rotating the fine adjustment stud 13, so as to achieve high-precision control of the pressure.

The main valve is mounted in the main valve chamber 23, and includes a main valve cover 14, a main valve spool 15, and a main valve spool drive rod 28, wherein the main valve cover 14 is provided with a main valve spool guide hole, and the main valve spool 15 is a cylindrical structure with its lower end tapering into a cone, and the diameter of a large end face of the cone (i.e. the diameter of the cylinder) is larger than the inner diameter of a lower step-surface of the main valve chamber 23; the main valve cover 14 is mounted in the upper step-surface area of the main valve chamber 23 via a threaded structure, an upper portion of the main valve spool 15 is extended into the main valve spool guide hole, a lower portion of the main valve spool 15 is extended into the lower step-surface area of the main valve chamber 23, and an upper end of the main valve spool drive rod 28 is welded to the cone at its tip. The main valve chamber 23, the main valve cover 14, the main valve spool guide hole, the main valve spool 15, and the main valve spool drive rod 28 are kept as coaxial as possible.

The spring energy storage linkage mechanism includes a guide block 5, a valve spool control linkage 17, a tension spring 18, and a tension spring shift lever 2 and a tension spring sliding hook 3; wherein a mounting boss 31 is provided at an upper portion of the guide block 5, and the mounting boss 31 is inserted into the guide block mounting groove 24, such that an upper surface and a lower surface of the guide block 5 conform to a lower surface of the upper valve body 8 and a lower bottom surface of the oil inlet chamber 26, respectively, enabling the fixation of the guide block 5; a left side face of the guide block 5 is an arc guide rail with its middle portion protruding to the left, the tension spring sliding hook 3 is mounted on the arc guide rail, and an upper end of the tension spring shift lever 2 is weld-secured to a lower surface of the pressure adjustment valve spool 6; a left end of the valve spool control linkage 17 is connected to the middle portion of the guide block 5 via a clevis pin, an elongated hole is provided on a right end of the valve spool control linkage 17, a lower end of the main valve spool drive rod 28 is connected to the elongated hole on the right end of the valve spool control linkage 17 via a pin 19, and both ends of the tension spring 18 are engaged into a spring hook 30 at a right portion of the valve spool control linkage 17 and the tension spring sliding hook 3, respectively.

When the pressure adjustment valve spool 6 drives the tension spring shift lever 2 to move up/down, a lower/upper claw 29 of the tension spring shift lever 2 drives the tension spring sliding hook 3 to move up/down along the arc guide rail: when the tension spring sliding hook 3 moves to an upper-most position on the arc guide rail, the right end of the valve spool control linkage 17 moves upwards to its upper-most position; when the tension spring sliding hook 3 moves to a lower-most position on the arc guide rail, the right end of the valve spool control linkage 17 moves downwards to its lower-most position; and when the tension spring sliding hook 3 moves to the upper-most position on the arc guide rail, up and down movement of the right end of the valve spool control linkage 17 drives the main valve spool drive rod 28 and the main valve spool 15 to move vertically.

The description above merely gives the preferred embodiments of the present invention, and it should be noted that, several improvements and modifications may further be made by those of ordinary skills in the art without departing from the principle of the present invention, and these improvements and modifications should also be considered within the protection scope of the present invention.

What is claimed is:

1. A double-spring and high-precision hysteretic pressure control valve, comprising a lower valve body, an upper valve body, a double-spring pressure adjustment valve, a main valve, and a spring energy storage linkage mechanism;

the lower valve body is provided with an oil inlet chamber and an oil inlet, and the oil inlet chamber is communicated with an external oil source via the oil inlet;

a pressure control valve chamber that extends vertically and an oil drain hole are provided on the left side of the upper valve body, and an internal thread is provided at an upper portion of the pressure control valve chamber;

a main valve chamber with three step-surfaces that extends vertically and an oil outlet are provided on the right side of the upper valve body, the three step-surfaces gradually decrease in diameter from top to bottom, and an internal thread is provided in an upper step-surface region;

the lower valve body is fixed to the upper valve body, and the oil inlet chamber is communicated with the pressure control valve chamber and the main valve chamber, respectively;

the double-spring pressure adjustment valve comprises a rough adjustment stud, a rough adjustment spring, a fine adjustment stud, a fine adjustment spring, a spring guide sleeve, and a pressure adjustment valve spool, wherein the rough adjustment stud is provided with a threaded through-hole that extends vertically, and a rough adjustment spring mounting boss is provided at the bottom of the rough adjustment stud; a fine adjustment spring mounting boss is provided at the bottom of the fine adjustment stud, and a spring guide pillar is provided on an upper surface of the pressure adjustment valve spool; the fine adjustment stud is mounted within the rough adjustment stud via a threaded structure, and the rough adjustment stud is mounted at an upper portion of the pressure control valve chamber via a threaded structure, the pressure adjustment valve spool is provided at a lower portion of the pressure control valve chamber, upper and lower ends of the rough adjustment spring are sleeved on the rough adjustment spring mounting boss and the spring guide pillar, respectively, upper and lower ends of the fine adjustment spring are sleeved on the fine adjustment spring mounting boss and the spring guide pillar, respectively, and lower ends of the fine adjustment spring and the rough adjustment spring are separated by the spring guide sleeve;

the main valve comprises a main valve cover, a main valve spool, and a main valve spool drive rod, wherein the main valve cover is provided with a main valve spool guide hole, and the main valve spool is a cylindrical structure with its lower end tapering into a cone, and the diameter of a large end face of the cone is larger than the inner diameter of a lower step-surface of the main valve chamber; the main valve cover is mounted in the upper step-surface region of the main valve chamber via a threaded structure, an upper portion of the main valve spool is extended into the main valve spool guide hole, a lower portion of the main valve spool is extended into the lower step-surface region of the main valve chamber, and an upper end of the main valve spool drive rod is fixed to the cone at its tip;

the spring energy storage linkage mechanism comprises a guide block, a valve spool control linkage, a tension spring, and a tension spring shift lever and a tension spring sliding hook, wherein a left side face of the guide block is an arc guide rail with its middle portion protruding to the left, the tension spring sliding hook is mounted on the arc guide rail, and an upper end of the tension spring shift lever is fixed to a lower surface of the pressure adjustment valve spool; a left end of the valve spool control linkage is connected to the middle portion of the guide block via a clevis pin, an elongated hole is provided on a right end of the valve spool control linkage, a lower end of the main valve spool drive rod is connected to the elongated hole on the right end of the valve spool control linkage via a clevis pin, and both ends of the tension spring are engaged with a right portion of the valve spool control linkage and the tension spring sliding hook, respectively; when the pressure adjustment valve spool drives the tension spring shift lever to move up/down, a lower/upper claw of the tension spring shift lever drives the tension spring sliding hook to move up/down along the arc guide rail: when the tension spring sliding hook moves to an upper-most position on the arc guide rail, the right end of the valve spool control linkage moves upwards to its upper-most position; when the tension spring sliding hook moves to a lower-most position on the arc guide rail, the right end of the valve spool control linkage moves downwards to its lower-most position; and when the tension spring sliding hook moves to the upper-most position on the arc guide rail, up and down movement of the right end of the valve spool control linkage drives the main valve spool drive rod and the main valve spool to move vertically.

2. The double-spring and high-precision hysteretic pressure control valve according to claim 1, wherein the spring guide pillar on the upper surface of the pressure adjustment valve spool has a same diameter as that of the fine adjustment spring mounting boss at the bottom of the fine adjustment stud, and the height of the spring guide sleeve is smaller than or equal to the height of the rough adjustment spring when being completely compressed.

3. The double-spring and high-precision hysteretic pressure control valve according to claim 1, wherein the height of the guide block is same as the depth of the oil inlet chamber, and an upper surface and a lower surface of the guide block conform to a lower surface of the upper valve body and a lower bottom surface of the oil inlet chamber, respectively; a mounting boss is provided at an upper portion of the guide block, and a guide block mounting groove is provided on the lower surface of the upper valve body, and the mounting boss is inserted into the guide block mounting groove.

4. The double-spring and high-precision hysteretic pressure control valve according to claim 1, wherein the lower valve body and the upper valve body are fixedly connected via a bolt.

\* \* \* \* \*